US006781005B1

(12) United States Patent
Casteel, Jr. et al.

(10) Patent No.: US 6,781,005 B1
(45) Date of Patent: Aug. 24, 2004

(54) PROCESS FOR THE FLUORINATION OF BORON HYDRIDES

(75) Inventors: William Jack Casteel, Jr., Emmaus, PA (US); Sergei Vladimirovich Ivanov, Schnecksville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/427,341

(22) Filed: May 1, 2003

(51) Int. Cl.⁷ ............................... C07F 9/02; C07F 7/00
(52) U.S. Cl. ...................... 556/7; 556/8; 568/3; 568/4; 568/6
(58) Field of Search ............................ 556/7, 8; 568/3, 568/4, 6

(56) References Cited

U.S. PATENT DOCUMENTS 3,551,120 A    12/1970   Miller et al. .................. 23/358
6,180,829 B1   1/2001    Strauss et al. ................. 568/3
6,448,447 B1   9/2002    Strauss et al. ................. 568/3

OTHER PUBLICATIONS

Knoth et al, *Chemistry of Boranes, IX, Fluorination of $B_{10}H_{10}$–2 and $B_{12}H_{12}$–2*, Inorganic Chemistry, vol. 2, No. 2, Feb. 1964.

Solntsev, et al, *Stereochemical Aspects of the Fluorination of the $B_{12}H_{12}$–2 Anion*, Russian Journal of Coordination of Chemistry, vol. 23, No. 6, 1997, pp 369–376.

*Primary Examiner*—Porfirio Nazario-Gonzalez
(74) *Attorney, Agent, or Firm*—Anne B. Kiernan

(57) ABSTRACT

This invention relates to an improvement in a liquid phase process for the direct fluorination of borohydride salts including the $B_{10}H_{10}^{-2}$ and $B_{12}H_{12}^{-2}$ salts wherein said borohydride salt is contacted with fluorine, under conditions for forming said fluorinated borohydride salt. The improvement in the liquid phase process resides in effecting the fluorination of said borohydride salt in the presence of a reaction medium having an acidity between that of water and anhydrous HF. More specifically, the reaction medium should have a Hammett acidity, $H_o$, between $0 > H_o > -11$.

22 Claims, No Drawings

PROCESS FOR THE FLUORINATION OF BORON HYDRIDES

BACKGROUND OF THE INVENTION

Halogenated boron hydride anions are weakly coordinating anions and have been used as electrolytes and as catalytic components, particularly to enhance the catalytic activity of metal cations finding use in a variety of reactions. Typically, the halogenated boron hydrides have been the fluorinated, chlorinated, and brominated borohydrides.

The following references are illustrative of processes for the production of halogenated boron hydrides, including fluorinated borohydrides:

U.S. Pat. No. 3,551,120 discloses boron compounds of the formula $M_a(B_{12}H_{12-y}X_y)_b$ where M is a cation having a valence of 1–4, and $(B_{12}H_{12-y}X_y)$ is a group which forms a divalent anion in an aqueous solution. The term M represents hydrogen, ammonium, and metal cations, e.g., groups I, II VIII, IIIb and so forth. X represents halogen, (F, Cl, Br, and I), carboxyl, nitro, nitroso, sulfonyl, and so forth. Example 1 shows the formation of $Cs_2B_{12}H_7F_5$ by effecting fluorination of $CsB_{12}H_{11}OH$ in anhydrous HF.

U.S. Pat. No. 6,180,829 discloses metal compounds of polyhalogenated heteroborane anions of the formula $M[R_aZB_bH_cF_dX_e(OR'')_f]_k$ where M is a cation having a valence of from 1–4, e.g., an alkali or alkaline earth metal cation, R typically is a halogen or an alkyl group, Z is C, Si, Ge, Sn, Pb, N, P, As, Sb, and Bi; X is a halide and R'' is a polymer, hydrogen, alkyl and the like. The subscripts represents integers. Example 2 shows the formation of the polyfluorinated monocarborane anion from a monocarborane hydride wherein $CaCB_{11}H_{12}$ is reacted with a mixture of HF and 10% $F_2$ in $N_2$. $CsCB_{11}F_{11}H$ was recovered as a white solid. Significant cluster decomposition occurred during the fluorination, and yields were 50–60% at these loadings.

U.S. Pat. No. 6,448,447, a continuation-in-part of U.S. Pat. No. 6,180,829 and others, discloses in Example 11 the formation of $K_2B_{12}F_{12}$ (1 g) by the continuous addition of a fluorine/nitrogen gas phase to a suspension of $K_2B_{12}H_{12}$ in HF.

Knoth et al, *Chemistry of Boranes, IX. Fluorination of $B_{10}H_{10}^{-2}$ and $B_{12}H_{12}^{-2}$* Inorganic Chemistry, Vol. 2, No. 2, Feb. 1964 disclose the preparation of highly fluorinated decaborates, by (a) effecting fluorination with anhydrous HF alone to a composition up to $B_{12}F_6H_6^{2-}$, and, (b) effecting the direct fluorination of a 5 wt. % $B_{12}H_{12}^{2-}$ potassium salt by contacting the salt with $F_2$ in the presence of water (under these conditions, the HF concentration is never >10% and thus the Hammett acidity, $H_o$ remains >0 throughout the fluorination. (Gillespie and Liang)) The reaction when conducted in the presence of water was difficult to run to completion as evidenced by the use of a 5-fold excess of fluorine. In the end, a low yield (32%) of a hydroxy substituted fluoroborate, $B_{12}F_{11}(OH)^{2-}$ was obtained rather than the desired fluorine substituted dodecaborate.

Sointsev, et al, *Stereochemical Aspect of the Fluorination of the $B_{12}H_{12}^{-2}$ Anion*, Russian Journal of Coordination of Chemistry, Vol. 23, No. 6, 1997, pp 369–376, disclose that the reaction of supercritical HF with $K_2B_{12}H_{12}$ at 600° C. generates the fully fluorinated anion. Significant decomposition was observed and yields of only 25% were obtained under these conditions.

SUMMARY OF THE INVENTION

This invention relates to an improvement in a liquid phase process for the direct fluorination of borohydride salts including the $B_{10}H_{10}^{-2}$ and $B_{12}H_{12}^{-2}$ salts to broadly produce compounds of the formula, $M_a[R_bZ_cB_dH_eF_y]_k$ where M is a cation having a valence of from 1–4, e.g., an alkali or alkaline earth metal cation, R typically is a halogen or an alkyl group, Z is C, Si, Ge Sn, Pb, N, P, As, Sb, or Bi; L; B is boron, H is hydrogen, a is 1 or 2; b is an integer from 0 to 7; c is an integer from 0 to 1; d is an integer from 5 to 12; e is an integer from 0 to 9; y is an integer from 3 to 12 and k is 1, 2 or 3, the respective values of a and k are determined by the valence of M, that is when the integer a is multiplied by the valence of M it is equal to the integer k or 2 times the integer wherein said borohydride salt is contacted with fluorine, under conditions for forming said fluorinated borohydride salt. The improvement in the liquid phase process resides in effecting the fluorination of said borohydride salt in the presence of a reaction medium having an acidity between that of water and neat HF. More specifically, the reaction medium should have a Hammett acidity, $H_o$, such that $0>H_o>-11$. In a preferred embodiment the reaction medium, e.g., the carrier should be capable of solubilizing the borohydride salt to provide loadings of 10% and greater by weight of the borohydride salt in the carrier. Preferred fluorinated compounds are $M_aB_{10}H_{(10-y)}F_y$ and $(M_aB_{12}H_{(12-y)}F_y$, where y>3 and more preferably y is at least 9 for the compound $M_aB_{10}H_{(10-y)}F_y$ and at least 10 for the compound $M_aB_{12}H_{(12-y)}F_y$.

Several advantages can be achieved through the process described here. These include:

an ability to achieve high levels of fluorination of the borohydride anions, e.g., where y is 10–12;

an ability to achieve excellent yields and reaction efficiency;

an ability to achieve high loadings of reactant in the carrier; and, an ability to minimize yield loss due to byproduct formation.

DETAILED DESCRIPTION OF THE INVENTION

As stated in the summary, this invention relates to an improvement in a process for fluorinating borohydride anions to make the salt, $M_a[R_bZ_cB_dH_dF_f]_k$, preferably the decaborate and dodecaborate anions of the formula, $B_{10}H_{10-y}F_y^{2-}$ and $B_{12}H_{12-y}F_y^{2-}$, and preferably a process for the preparation of perfluorinated dodecaborate anions of the formula, $B_{12}F_y(H_{12-y})^{2-}$ where $y \geq 3$ and more preferably where $y \geq 10$. The improvement in the process resides in effecting the fluorination reaction in a medium having an acidity wherein the Hammett acidity ($H_o$) is greater than −11 and less than 0, preferably from −6 to −2. By operating at the above acidity and at an acidity substantially below that of anhydrous or neat HF (Hammett acidity of −11 to −15) as practiced in the prior art, one can improve the solubility of the fluorinated borohydride salt in the medium, achieve more efficient fluorination of the borohydride anion, e.g., the dodecaborate anion, e.g., $B_{12}(H_{12-y})F_y^{2-}$ (y=10–12) and one can operate at higher loadings and achieve excellent conversion, with minimal byproducts.

In the borohydride salt, M is a cation. The principal function of the group M is to provide an element or group of elements which bear the necessary positive charge to combine with the anion, e.g., $(B_{12}H_{12-y}X_y)^{-2}$, and thus permit its isolation as part of a stable compound. The properties of the group M are not absolutely critical although some may lead to enhanced solubility of the precursor borohydride and fluorinated borohydride salts in the reaction medium. Examples of cations, M, include hydrogen, hydronium. ($H_3O^+$), ammonium ($NH_4^+$), hydrazonium ($NH_2NH_3^+$) (also called hydrazinium), N-substituted ammonium, N-substituted hydrazinium. ($CH_3NHNH_3^+$), aryldiazonium ($ArN_2^+$), sulfonium, phosphonium, metalamine, 2,2'-bipyridinium, quinolinium, phenazonium, N-alkylpyridinium, and the like.

Examples of the N-substituted ammonium radical, an S-substituted sulfonium group and a P-substituted phosphonium group are of the formula $R'NH_3^+$, $R'_2NH_2^{+1}$ $R'_3NH^+$, $R'_4N^+$, $R'_3S^+$, and $R'_4P^+$. The R' groups are not critical features of these cation groups; thus, R' can be open chain, closed chain, saturated or unsaturated hydrocarbon or substituted hydrocarbon groups. R' can be a heterocyclic ring of which the nitrogen, sulfur or phosphorus atom is a component part. Thus, when M is a substituted ammonium group, R' can be derived from pyridine, quinoline, morpholine, hexamethyleneimine, and the like. Preferably, R', for reasons of availability of reactants, contains at most 18 carbon atoms. For example, R' can be methyl, ethyl, propyl, butyl, 2-ethylhexyl, octadecyl, allyl, cyclohexyl, cyclohexenyl, phenyl, naphthyl, anthryl, cyclohexylphenyl, diphenylyl, benzyl, chloroethyl, ω-cyanoamyl, β-hydroxyethyl, ρ-hydroxyphenyl, and the like.

Examples of N-substituted hydrazonium (also called hydrazinium) radicals in the above list have the formulas $(R'NHNH_3)^+$, $(R'_2NNH_3)^+$, and the like. In the formula, R' has the same definition as given in the preceding paragraph. To illustrate, the hydrazonium cation can be derived from phenythydrazine, methylhydrazine, 1,1-dimethylhydrazine, 1,2-dimethylhydrazine, ethylhydrazine, 1,1-diethylhydrazine, and similar compounds.

Examples of N-substituted hydrazonium (also called hydrazinium) radical in the above list have the formulas $(R'NH(NH_3))^+$, $(R'_2NNH_3)^+$, and the like. In the formula, R' has the same definition as given in the preceding paragraph. To illustrate, the hydrazonium cation can be derived from phenylhydrazine, methylhydrazine, 1,1-dimethylhydrazine, 1,2-dimethylhydrazine, ethylhydrazine, 1,1-diethylhydrazine, and similar compounds.

Another class of the cation M are metals from Groups 1, II, VIII, III-B, IV-B, V-B, VI-B, and VII-B of the periodic table. To illustrate, M can be lithium, sodium, potassium, cesium, beryllium, barium, lanthanum, zirconium, vanadium, manganese, iron, cobalt, copper, zinc, mercury, aluminum, thallium, tin, lead, antimony, bismuth, and silver. Preferred metals are those whose valences are 1–3, inclusive. An especially preferred group of metals from which M can be derived consists of elements of Groups I-A, II-A, I-B and II-B having atomic numbers up to and including 80. Most preferred metals are the alkali and alkaline earth metals, i.e., lithium, sodium, potassium, rubidium, cesium, beryllium, magnesium, calcium, strontium, and barium.

The borohydride anion can be present in the salt in many forms. Broadly, the anion is represented within the formula: $[R_bZ_cB_dH_eF_y]$. R can be halogen, typically chlorine or bromine or alkyl. When R is halogen, other than fluorine, the integer b can be greater than 1, e.g., 0 to 5. When R is alkyl, typically the integer b is limited to 0 or 1. In the heteroborane hydride salts the term Z can apply to many metal and essentially non-metals, such as carbon, silicon, germanium, tin and so forth. In preferred systems, the borohydride anions are represented by the formulas: $B_{10}H_{10}^{2-}$ and $B_{12}H_{12}^{2-}$.

Direct fluorination of borohydrides is carried out in a liquid medium. Fluorine is diluted with an inert gas, e.g., nitrogen, when effecting fluorination. Fluorine concentrations from 10 to 40% by volume are commonly employed.

The liquid medium or carrier for the borohydride salt is one that is not substantially reactive with fluorine. Conventional mediums include HF. Other liquids can be used in the process described here and include water, organic acids such as formic and acetic acid, trifluoroacetic acid and the like.

The acidity of the fluorination medium, particularly that employed in the fluorination of the borohydrides affect the solubility of the precursor and the fluorinated borohydride salt. In the above list, many of the liquid carriers also effect an acidity change therein. For example, the addition of water, acetonitrile, or protic acid, e.g., formic acid or acetic acid to HF reduces the acidity of neat or anhydrous HF. The addition of buffering salts, e.g., alkali metal fluorides such as potassium and sodium fluoride can also reduce the acidity of neat HF in the fluorination reaction. A preferred carrier system employs HF as it is formed, in situ, by the reaction of fluorine with many of the carriers anyway. In sum, based upon experimental observation, these reaction mixture must be substantially weaker than anhydrous HF in order to achieve the results contemplated but more acidic than water.

Acids suitable for use in fluorination, e.g., fluorination, are $C_{1-4}$ alkyl acids, preferably $C_{1-2}$ acids. Examples of acids include formic, acetic, trifluoroacetic, dilute sulfuric triflic, and sulfonic acids hydrohalic ($HCl_{(aq)}$, $HBr_{(aq)}$, $HI_{(aq)}$, and $HF_{(aq)}$.

Radical scavengers can be used in the fluorination process to reduce byproduct formation and improve reaction efficiency. In aqueous solutions, radical scavengers appear to limit the formation of hydrogen peroxide, or HOF which may be generated with fluorine. Radical scavengers when used in liquid carriers where organic acids, such as formic acid, are used to adjust acidity, and inhibit the side-reaction of fluorine with the solvent, thereby improving fluorination efficiency. Examples of radical scavengers include oxygen, and nitroaromatics. The introduction of a small amount of air to the liquid medium removes free radicals generated in the direct fluorination of the borohydride salts.

Fluorination of the borohydride anion can be carried out over a temperature range sufficient to maintain liquid phase conditions. For effecting the fluorination of the dodecaborate anion the temperature is from –30–100° C., typically from 0 to 20° C. Pressures during fluorination are such as to maintain liquid phase conditions, typically atmospheric for the fluorination of the dodecaborate anion.

As mentioned previously, one of the problems in the prior art fluorination of the borohydride anion was one of byproduct formation. Although not intending to be bound by theory the following factors are relevant to the formation of the side products of fluorinating borohydrides, e.g., the dimeric anion $B_{24}F_{22}^{4-}$. The proposed structure of $B_{24}H_{23}^{3-}$ derives from the two $B_{12}H_{11}$ clusters linked by a hydrogen-bridge bond. From the mechanistic point of view, the dimer may form either by the reaction between the two-uninegative radical anions $B_{12}H_{12}$ (such radical anions were observed in the negative ion electrospray spectra of $B_{12}H_{12-y}F_y^{2-}$), or by the reaction between the $B_{12}H_{12}^{2-}$ and the two-electron oxidized neutral cluster. Under highly acidic conditions the dimer may also form by the reaction between the two protonated clusters $$HB_{12}H_{12}^- + HB_{12}H_{12}^- \rightarrow HB_{24}H_{22}^{3-} + H^+ + H_2 \qquad (1)$$

All of the above reactions involve the interactions of two molecules of boron cluster per reaction, and thus are second order in the anion concentration. The fluorination reactions are expected to be first order in the anion concentration, and from that an increase of the concentration of the starting material would be expected to give higher levels of the dimer side product. The surprising finding here is that fluorination of borohydride salts in weaker acid mediums than neat liquid HF, including anhydrous HF with an added base, result in little or no dimer products on fluorination. Because of that finding, it suggests that reaction 1 above predominates and this accounts for high byproduct formation as noted in prior art processes.

The following examples are provided to illustrate various embodiments of the invention and are not intended to restrict the scope thereof. Recovery methods in the comparative examples and representative examples are not to be considered as admission that they are prior art processes. The term "%loading" is used to indicate the grams borohydride salt dispersed per gram reaction mixture including carrier.

Comparative Example 1

Fluorination of $K_2B_{12}H_{12}$ in Anhydrous HF

To provide a control, approximately 300 mg (1.4 mmol) $K_2B_{12}H_{12}$ was dissolved in 30 mL anhydrous HF (1% loading) and the solution allowed to stand for 2 hrs at 25° C. After evacuating hydrogen, the solution was cooled to –30° C. and fluorinated by bubbling 20%$F_2$/$N_2$ through the solution. After addition of ~8 mmol fluorine the sparger completely plugged and fluorine addition was discontinued. Solvent was removed under vacuum and 19F NMR analysis of the crude product revealed a mixture of $B_{12}F_2H_{10}^{2-}$, $B_{12}F_3H_8^{3-}$, $B_{12}F_{11}H^{2-}$, and $B_{12}F_{12}^{2-}$ anions as well as a small amount of $BF_4^-$. Complete fluorination was not achieved in this exemplary prior art procedure.

Comparative Example 2

Fluorination of $Cs_2B_{12}H_{12}$ in Anhydrous HF

The procedure of Example 1 was followed except that $Cs_2B_{12}H_{12}$ was substituted for $K_2B_{12}H_{12}$. Fluorine NMR spectra of the product indicated the presence of $B_{12}H_{10}F_2^{2-}$, $B_{12}H_8F_3^{2-}$ (products of the reaction with HF only) and $B_{12}HF_{11}^{2-}$, and $B_{12}F_{12}^{2-}$. There were almost no derivatives with intermediate numbers of fluorine atoms.

A major problem observed in this fluorination was the plugging of the fluorine sparger/bubbler during the reaction.

Comparative Example 3

Fluorination of $K_2B_{12}H_{12}$ with Anhydrous HF and $BF_3$

In an effort to overcome plugging of the $F_2$ sparger, the acidity of the reaction medium was increased by addition of $BF_3$. To a slurry of 1 g (4.5 mmol) $K_2B_{12}H_{12}$ in 10 ml HF was added ~10 mmol $BF_3$ at 20° C. The $BF_3$ was added in several aliquots to the reactor headspace above the solution, because it was observed that while it initially dissolved readily, the corresponding hydrogen generated eventually limited the amount of $BF_3$ addition. Hydrogen had to be evacuated before further $BF_3$ addition could take place. At the completion of the reaction volatiles were removed leaving a colorless solid product. $^{19}$F NMR showed $B_{12}F_4H_8^{2-}$ as the predominate dodecaborate cluster anion.

Use of $BF_3$ to increase solution acidity does increase the extent of HF fluorination of the more basic $K_2B_{12}H_{12}$ salt, but results in the formation and subsequent precipitation of $KBF_4$, rapid evolution of hydrogen and the formation of mostly $B_{12}H_8F_4^{2-}$. Unfortunately, the filtration of $KBF_4$ from the reaction mixture was difficult. The residual $KBF_4$ left in the filtrate was precipitated from the solution during the further fluorination and plugged the sparger. The perceived reaction is described as follows:

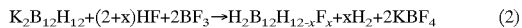

$$K_2B_{12}H_{12}+(2+x)HF+2BF_3 \rightarrow H_2B_{12}H_{12-x}F_x+xH_2+2KBF_4 \qquad (2)$$

Comparative Example 4

Fluorination of $Li_2B_{12}H_{12}$ in Anhydrous HF (3% loading)

The procedure of Example 1 was followed except the lithium dodecaborate salt was used at a 3% loading. Approximately 1.0 g (6.4 mmol) $Li_2B_{12}H_{12}$ was dissolved in 30 mL anhydrous HF and the solution allowed to stand for 2 hrs at 25° C. After evacuating hydrogen, the solution was cooled to –30° C. and fluorinated by bubbling 20%$F_2$/$N_2$ through the solution. Fluorine was added (~65 mmol) until the initially colorless solution suddenly changed to deep blue in color (presumably indicative of radical anion formation. Evacuation of HF to dryness left a colorless solid. $^{19}$F NMR analysis of the crude product showed predominantly $B_{12}F_{12}^{2-}$ and $B_{24}F_{22}^{4-}$ in the mole ratio 8.3/1 along with small amounts of $BF_4^-$.

Although the fluorination was more effective in this example than in Examples 1 and 2, a problem with the fluorination of this salt is that it is limited in the loading of reactant, $Li_2B_{12}H_{12}$, in the carrier. Although a 3% loading was used in comparison to the 1% loading in Examples 1 and 2, it is too low for commercial applications.

Comparative Example 5

Fluorination of $Li_2B_{12}H_{12}$ in Anhydrous HF (30% loading)

The procedure of Comparative Example 4 was followed to determine the effect of a higher loading of reactant in the fluorination process. $Li_2B_{12}H_{12}$, 5 g (32 mmol) was dissolved in 15 ml anhydrous HF and the solution allowed to stand for 2 hrs at 25° C. After evacuating hydrogen, the solution was cooled to –30° C. and fluorination was effected by bubbling 20%$F_2$/$N_2$ through the solution. Very rapidly, solids began to form in the solution. After addition of 150 mmol fluorine, a large quantity of colorless solid had formed and the fluorine bubbler began to plug. After addition of a total of 210 mmol fluorine, solvent was removed leaving behind an intractable white solid, which, unlike $B_{12}$ cluster anions was insoluble in water. An IR spectrum of this solid suggests the compound is an oligomeric mixture of B—H—B (or B—O—B) bridged partially fluorinated cluster anions.

This example demonstrates that efforts to increase the loading of the reactant in neat liquid HF did not meet with success. It is surmised this is because of the insolubility of the fluorinated product in the carrier and the formation of impurities in such a strong acid.

Comparative Example 6

Fluorination of $(H_2O)_n B_{12}H_{12}$ with Fluorine in Anhydrous HF (2% loading)

The fluorination of 2 weight % solution of $H_2B_{12}H_{12} \times 6 H_2O$ in HF at approximately –15° C. with 20% $F_2$ in $N_2$ afforded $B_{12}F_{12}^{2-}$ with a very low content of the other anions (side-products). Based on the $^{19}$F NMR spectrum of the crude reaction mixture, the molar ratio of the anions were: $B_{12}F_{12}^{2-}$ (1), $B_{24}F_{22}^{4-}$ (0.01), $B_{12}F_{11}(OH)^{2-}$ (0.05) and $BF_4^-$ (0.36). The formula of the dimer is assumed based on its $^{19}F$ NMR spectrum; there were 3 fluorine signals with 5:5:1 ratios. The presence of a signal with $m/z_{av}=1403$ in the negative ion electrospray spectrum of its tetrabutylammonium salt is the same as $m/z_{av}$ of the ion $[(Bu_4N)_3B_{24}F_{22}]^-$. Approximately 3 mol % of $B_{12}H_{12}^{2-}$ has to decompose during the reaction to produce the molar ratio of $BF_4^-$ to $B_{12}F_{12}^{2-}$ 0.36. Thus, the yield of $B_{12}F_{12}^{2-}$ in the above reaction was close to 90%.

The results show good yields were obtained in the fluorination of the salt. However, a 2% loading, which was used in comparison to the 1% loading in Examples 1 and 2, is too low for commercial applications.

Comparative Example 7

Fluorination of $(H_2O)_n\ B_{12}H_{12}$ with Fluorine in Anhydrous HF (15% loading)

The procedure of Comparative Example 6 was followed to determine the effect of higher loading of reactant. The solid $H_2B_{12}H_{12}\cdot nH_2O$ (20.8 g) was treated with 120 ml of HF at –40° C. in a 300 ml Parr reactor. The mixture was warmed up to 35° C. and heated at this temperature for one hour, and then at 60° C. for 40 min. The evolved hydrogen was removed under vacuum. The mixture was cooled down to –25° C. and 20% fluorine/nitrogen mixture was passed through the reaction mixture at 200 ml/min. The reaction temperature was increased to –10° C. and the flow rate was increased to 300 ml/min within one hour and was kept at this rate. The total amount of the fluorine passed was 2400 ml, which corresponds to ~12 equiv. of fluorine per anion. $^{19}F$ NMR analysis of the crude product shows $B_{12}F_{12}^{2-}$ and $B_{24}F_{22}^{2-}$ as the main product in the molar ratio 1/0.12. All volatiles were removed under vacuum, the reaction products were dissolved in 150 ml of water, and triethylamine (16 g) was added. A white precipitate that formed was collected by filtration. The solid was redissolved in acetone and small amount of insoluble material was removed by filtration. Acetone was removed under vacuum, the remaining solid was washed with water, and dried under vacuum to produce 26.6 g of $[Et_3NH]_2[B_{12}F_{12}]$. (55% yield based on $H_2B_{12}H_{12}\cdot n\ H_2O$ (n=6), or 63% yield based on n=8)

As with other examples, the yield of polyfluorinated borohydride anion was low due to dimer formation in neat liquid HF.

Comparative Example 8

Fluorination of $BaB_{12}H_{12}$ with Fluorine in Anhydrous HF (20% loading)

The fluorination of anhydrous $BaB_{12}H_{12}$ was conducted in a manner similar to the process described in Example 7 except for the loading and the substitution of a barium salt. Approximately, 40–45 g of barium salt and 120–160 ml of HF were used per batch. The mixture was heated at ~80° C. for two hours followed by hydrogen removal prior to fluorine addition. The fluorine was passed through a mixture at –30° C. The fluorine sparger began to plug with a solid toward the end of fluorination. It was possible to flush the sparger by condensing HF into it, which indicated that the solids were quite soluble in HF, and were probably $BaB_{12}H_{12-n}F_n$.

The $B_{12}F_{12}^{2-}$ anion was isolated and purified as $[Et_3NH]_2[B_{12}F_{12}]$ as described above with 50–55% yield. Analysis of the crude product by $^{19}F$ NMR prior to workup showed primarily $B_{12}F_{12}^{2-}$ with ~ 15–20 mol % $B_{24}F_{22}^{2-}$ impurity. The latter representing the principal yield loss on workup.

The results show that the Ba salt resulted in higher fluorination than many of the salts illustrated in the previous examples but the yields remain low due to dimer formation in neat liquid HF and solubility remains a problem.

Comparative Example 9

Fluorination of $(TEAH)_2B_{12}H_{12}$ in Anhydrous HF

This example demonstrates the high solubility of triethylammonium dodecaborate salts throughout the fluorination with the formation of high levels of impurities in acids as strong as neat HF. Onto 2.22 g $(TEAH)_2B_{12}H_{12}$ was condensed ~10 mL anhydrous HF. On warming to room temperature hydrogen evolution was observed. When $H_2$ evolution had ceased a small amount of cream colored solid remained in a pale yellow solution. The HF was evacuated leaving a solid product. A few milligrams of the product analyzed by $^9F$ NMR and revealed to be primarily $(TEAH)_2B_{12}H_9F_3$ along with ~5% each of $(TEAH)_2B_{12}H_{10}F_2$ and what is believed to be a partially fluorinated dimer product $B_{24}F_6H_{16}^{-4}$.

The bulk of the solid was redissolved in ~10 mL anhydrous HF. The solution was cooled to –20° C. and 20% fluorine diluted with nitrogen was added.

Early in the fluorination, the solution was somewhat cloudy at –20° C., but solids quickly dissolved and no precipitate was observed over the remainder of the fluorination. At the completion of the fluorination, volatiles were removed. The product was extremely soluble in HF, and no solids were observed at room temperature until a concentration of ~80 wt % was achieved. The product was finally isolated as a glassy solid. $^{19}F$ NMR analysis shows the product consists of 65% $B_{12}F_{12}^{2-}$, 17% $B_{12}F_{11}H^{2-}$, and 17% of the dimer product $B_{24}F_{22}$ or near 35% dimer impurity on a weight basis.

Comparative examples 5–9, show, that with appropriate choice of cation substrate loadings can be increased in neat HF; however this is at the expense of significant yield loss due to byproduct, dimer, formation.

EXAMPLE 10

Fluorination of $(TEAH)_2B_{12}H_{12}$ in Anhydrous HF Buffered with Sodium Fluoride This example demonstrates that the highly soluble salt as shown in Example 9 can be fluorinated at high loading with minimal dimer formation in anhydrous HF provided the HF acidity is lowered with a fluoride buffer. Onto a mixture of 2.17 g $(TEAH)_2B_{12}H_{12}$ and 1.5 g sodium fluoride was condensed ~8 mL anhydrous HF. On warming to room temperature very little hydrogen evolution was observed, and a cream colored suspension was observed. The HF was evacuated leaving a solid product. A few milligrams of the product analyzed by $^{19}F$ NMR and showed that no fluorination had occurred, confirming that the acidity of anhydrous HF has been significantly lowered.

The slurry was cooled to between –15 and –20° C. and 20% $F_2/N_2$ was added. During the fluorination no color change was observed, but the slurry became significantly less viscous. At the completion of the fluorination, volatiles were removed leaving a finely divided solid product. $^{19}F$ NMR analysis shows the product consists of 85% $B_{12}F_{12}^{2-}$, 12% $B_{12}F_{11}H^{2-}$, 3% $B_{12}F_{10}H_2^{2-}$ and no observable dimer byproduct.

EXAMPLE 11

Fluorination of $K_2B_{12}H_{12}$ with Fluorine in Formic Acid (15% Loading, $O_2$ Added)

In this example, a more weakly acidic (than neat HF) reaction medium was used, namely formic acid. In this example, a colorless slurry containing 1.8 g (7.2 mmol) $K_2B_{12}H_{12}CH_3OH$ in 10 ml formic acid was fluorinated at 0 to 10° C. A total of 108 mmol $F_2$ (25% excess) was added as $10\%F_2/10\%O_2/80\%N_2$. Over the course of the fluorination, the average Hammett acidity of the reaction medium ranged from −2 to 4, and all solids completely dissolved leaving a colorless, homogeneous solution at the completion of the fluorination. Analysis of the crude product solution by $^{19}F$ NMR revealed primarily $B_{12}F_{11}H^{2-}$ (35%), and $B_{12}F_{12}^{2-}$ (60%) and approximately 5% of the monohydroxy impurity $B_{12}F_{11}OH$. No dimer impurity was observed. Isolation of the product through the triethylammonium salt as above removed impurities and gave the above fluorinated borate cluster products in 80% yield.

The results show that formic acid was effective in minimizing precipitate in the reaction product and byproduct formation as for example in comparison to Example 7 at similar loading.

EXAMPLE 12

Fluorination of $K_2B_{12}H_{12}$ with Fluorine in Formic Acid (30% Loading; $O_2$ Added)

The procedure of Example 11 was followed except that the loading was doubled. A colorless slurry containing 2.96 (11.8 mmol) $K_2B_{12}H_{12}CH_3OH$ in 6 ml formic acid at an average Hammett acidity of $H_o$=−2 to −4 was fluorinated at 0 to 20° C. as described In Example 11. When 100% of the desired $F_2$ (142 mmol) was added as a mixture of $10\%F_2/10\%O_2/80\%N_2$, a colorless solution remained. Further fluorination (3%) at 30° C. resulted in precipitation of solid from solution. Solvents were evacuated overnight, leaving 5.1 g of a colorless, friable solid. Analysis of this crude product by $^{19}F$ NMR revealed primarily $B_{12}F_{10}H_2^{2-}$ (60%), $B_{12}F_{11}H^{2-}$ (35%), and $B_{12}F_{12}^{2-}$ (5%). Half of this solid was taken and redissolved in 3.8 g formic acid and 3 g HF. An additional 29 mmol $F_2$ was added and solvents were evacuated as before. A light pink solid (2.7 g) remained. Analysis of this crude product by $^{19}F$ NMR revealed primarily $B_{12}F_{11}H^{2-}$ (35%), and $B_{12}F_{12}^{2-}$ (60%). Less than 2% hydroxy substituted compounds were observed.

Examples 11 and 12 show that formic acid proved effective as an acidic modifier for the fluorination of $B_{12}H_{12}^{2-}$. Even at a loading as a 30 wt. % slurry, the salt could be efficiently fluorinated to give $B_{12}F_yH_{(12-y)}^{2-}$ (y=10–12) in 70–90% yield with no dimer formation and little hydroxyl substitution on the cluster. Example 12 also shows that the borohydride salts that are fluorinated by the process of this invention may be fluorinated borohydride salts.

EXAMPLE 13

Fluorination of $K_2B_{12}H_{12}$ with Fluorine in Formic Acid (20% Loading; No $O_2$ added)

The procedure of Example 12 was followed except for the loading. A colorless slurry containing 2.00 g (8 mmol) $K_2B_{12}H_{12}CH_3OH$ in 8 ml formic acid was fluorinated at 0 to 20° C. with a gas mixture of $10\%F_2/90\%N_2$. A total of 116 mmol $F_2$ was added (22% excess). Solvents were evacuated overnight Analysis of this crude product by $^{19}F$ NMR revealed significantly lower conversions than when $O_2$ had been present in Examples 11 and 12. The predominant species were $B_{12}F_yH_{(12-y)}^{2-}$ (where x=8–10).

This example serves to show the impact of a radical scavenger on dodecaborate salts in anhydrous organic solvents.

EXAMPLE 14

Fluorination of $K_2B_{12}H_{12}$ with Fluorine in Acetic Acid (15% Loading, $O_2$ Added)

A slurry of 2.01 g $K_2B_{12}H_{12}CH_3OH$ in 10 g glacial acetic acid was fluorinated at 20° C. with $10\%F_2/10\%O_2/80\%N_2$. A total of 116 mmol $F_2$ was added (22% excess). The slurry remained colorless throughout the fluorination and while its viscosity, decreased, complete dissolution of the solid was never observed. At the completion of the fluorination, the product slurry gave a negative iodide test for oxidizer. Solvents were then evacuated and the crude product dissolved in water. Triethylammonium hydrochloride (240 mmol) was added along with a enough triethylamine to bring the solution pH up to 5. The product was filtered, washed with water and dried. 32 g (65% yield) of fluoroborate salts were isolated. $^{19}F$ NMR analysis showed $B_{12}F_{10}H_2^{2-}$ (7%), $B_{12}F_{11}H^{2-}$ (18%), and $B_{12}F_{12}^{2-}$ (7%) with only traces of hydroxy-substituted impurities.

Although acetic acid was effective in providing the desired acidity for the reaction medium, acetic acid can be fluorinated itself, leading to potential hazardous byproducts.

EXAMPLE 15

Fluorination of $K_2B_{12}H_{12}$ with Fluorine in Acetic Acid (15% Loading, No $O_2$ Added)

A slurry of 2.01 g $K_2B_{12}H_{12}CH_3OH$ in 10 g glacial acetic acid was fluorinated at 20° C. with $10\%F_2/90\%N_2$. A total of 116 mmol $F_2$ was added (22% excess). The slurry remained colorless throughout the fluorination and, while its viscosity decreased, complete dissolution of the solid was never observed. At the completion of the fluorination the product slurry gave a negative iodide test for oxidizer. Solvents were then evacuated and the crude product dissolved in water. Triethylammonium hydrochloride (240 mmol) was added along with enough triethylamine to bring the solution pH up to 5. The product was filtered, washed with water and dried. 2.8 g (62% yield) of fluoroborate salts were isolated. $^{19}F$ NMR analysis showed $B_{12}F_{10}H_2^{2-}$ (15%), $B_{12}F_{11}H^{2-}$ (26%), and $B_{12}F_{12}^{2-}$ (59%) with only traces of hydroxy-substituted impurities.

This example in contrast to Example 14 shows the effectiveness of the $O_2$ as a radical scavenger in improving conversion by suppressing reaction of fluorine with the solvent.

Examples 14 and 15 show that acetic acid gave comparable reactivity to formic acid as in Examples 11 and 12, but the latter solvent is known to form potentially hazardous byproducts with fluorine. For solvents with which fluorine reacts readily, such as formic acid, added oxygen proved to be an efficient radical scavenger.

EXAMPLE 16

Fluorination of $K_2B_{12}H_{12}$ with Fluorine in Formic Acid/HF (15% Loading)

A slurry of 2.16 g (9.81 mmol) dry $K_2B_{12}H_{12}$ in 10 g formic acid and 4 g HF was fluorinated with $10\%F_2/10\%O_2/$ 80%/N$_2$ at 0° C. A total of 141 mmol F$_2$ was added (20% excess). All solids completely dissolved over the course of the fluorination. At the completion of the fluorination the product solution gave a negative iodide test for oxidizer. Solvents were then evacuated and the crude product dissolved in water. Triethylammonium hydrochloride (mmol) was added along with enough triethylamine to bring the solution pH up to 5. The product was filtered, washed with water and dried. 3.8 g (78 % yield) of fluoroborate salts were isolated. $^{19}$F NMR analysis showed B$_{12}$F$_{11}$H$^{2-}$ (25%), and B$_{12}$F$_{12}{}^{2-}$ (75%) with only traces of hydroxy-substituted impurities.

This example shows that organic acids further acidified with anhydrous HF, to a Hammett acidity between that of the organic acid and neat HF, are an effective reaction media for fluorination of dodecaborate salts.

EXAMPLE 17

Fluorination of K$_2$B$_{12}$H$_{12}$ with Fluorine in 0.5 M H$_2$SO$_4$ (15% Loading: O$_2$ Added)

A solution of 1.99 g (7.9 mmol) K$_2$B$_{12}$H$_{12}$·CH$_3$OH in 9 ml 0.5M H$_2$SO$_{4(aq)}$ was fluorinated with 10%F$_2$/10%O$_2$/80%N$_2$ at 0° C. A total of 116 mmol F$_2$ was added (22% excess) and the solution changed from colorless to yellow to orange-brown over the course of the fluorination. The Hammett acidity of the reaction medium during fluorination was H$_o$=~−4. At the completion of the fluorination the product solution gave a negative iodide test for oxidizer and was then neutralized to pH 5 with triethylamine. The colorless solid product was filtered and washed. After drying 3.4 g product was isolated which was characterized by $^{19}$F NMR as 44% B$_{12}$F$_{10}$H$_2{}^{2-}$, 46% B$_{12}$F$_{11}$H$^{2-}$, and 10% B$_{12}$F$_{12}{}^{2-}$. The isolated yield was 78%.

The results show that dilute sulfuric acid with a Hammett acidity in the desired range is an effective reaction media.

EXAMPLE 18

Fluorination of 30% K$_2$B$_{12}$H$_{12}$ in Water

The procedure of Example 12 was followed except that a concentrated solution (30% K$_2$B$_{12}$H$_{12}$ in water) was fluorinated with 1 mol equiv. of fluorine at 0°. The fluorination gave surprisingly high yields (78% yield) of the polyfluorinated B$_{12}$F$_{10}$H$_2{}^{2-}$ and B$_{12}$F$_{11}$H$^{2-}$ anions with somewhat lower (10%) conversions to perfluorinated B$_{12}$F$_{12}{}^{2-}$. interestingly, very low, <10%, hydroxyl substitution was observed. More importantly there was no yield loss due to formation of the dimeric cluster anions B$_{24}$F$_{22-y}$H$_y{}^{4-}$. It is believed that in the fluorination in water, an acidic solution is generated by HF cogeneration (with 20–30% HF$_{(aq)}$ being present toward the completion of the fluorination). This reaction medium is of significantly lower acidity than anhydrous HF, but is still sufficiently acidic (reaching a Hammett acidity of H$_o$≈−2 during the fluorination) to allow a high degree of fluorination and maintain solubility of the product. Furthermore, the higher acidity of the aqueous solution, the lower is fluorine's reactivity with water to give H$_2$O$_2$ and HOF. These two byproducts appear to be involved in the formation of hydroxyl substituted borate side-products, B$_{12}$F$_{11}$OH$^{2-}$, during the fluorination.

This example shows that reaction media outside the desired acidity range may be used with good results provided sufficient HF is generated during the fluorination to bring the acidity within the desired range.

EXAMPLE 19

Fluorination of 30% K$_2$B$_{12}$H$_{12}$ in Water

Based on the above result the fluorination of K$_2$B$_{12}$H$_{12}$ was carried out in 50% HF(aq). This gave noticeably higher levels of fluorination, with 1 equiv. of fluorine giving a high yield of B$_{12}$F$_{11}$H$^{2-}$ and B$_{12}$F$_{12}{}^{2-}$ anions and still only small amounts of hydroxyl substitution and no dimer formation.

This example shows, in comparison with Example 18, that carrying out the entire fluorination in a reaction media of the preferred acidity is more effective than simply completing the fluorination in such a media.

EXAMPLE 20

Fluorination of K$_2$B$_{12}$H$_{12}$ with Fluorine in Water (20%) Loading; O$_2$ Added, HCO$_3$ Added)

An aqueous solution containing 2.0 g (8.0 mmol) K$_2$B$_{12}$H$_{12}$·CH$_3$OH, 7.8 g (93 mmol) NaHCO$_3$ in 25 mL water was fluorinated with 116 mmol 10% F$_2$/10% O$_2$/80% N$_2$ at between 0° C. and 20° C. The Hammett acidity remained >0 throughout the fluorination. The solution became pale yellow in color over the course of the fluorination.

At the completion of the fluorination, a sample of the crude product solution was analyzed by $^{19}$F NMR. This revealed relatively low conversion with B$_{12}$F$_8$H$_4{}^{2-}$, B$_{12}$F$_9$H$_3{}^{2-}$, B$_{12}$F$_{10}$H$_2{}^{2-}$ as the predominant species.

The results show that reaction media which remain below the desired level throughout the reaction give very inefficient fluorination.

From the Examples, reaction media having acidities intermediate between water and anhydrous HF, i.e., Hammett acidity 0>H$_o$>−11, prove most effective and allow for yields of 70–90% at 15–30% loading. Use of O$_2$ as a radical scavenger is shown to inhibit fluorine reaction in the acid medium thereby improving reaction efficiency.

The following is a commentary on the specific examples.

Comparative Examples 1–3 demonstrate that HF is not an optimal solvent for direct fluorination of the dodecaborate anion, particularly in the formation of borohydrides where y is 10 or greater. Although it was capable of partially fluorinating B$_{12}$H$_{12}{}^{2-}$ commercially available dodecaborate salts have a low, <2 wt. %, solubility in this solvent even when the HF is further acidified with BF$_3$.

Examples 4–9 show that changing that cation of the borohydride can significantly improve the solubility of the dodecaborate salts in HF, thereby allowing higher substrate loadings of 10% and greater which is required for commercial application. However, at substrate loadings of greater than 10%, as in Examples 5, 7, 8, 9, anhydrous or neat HF leads to significant and irreversible yield loss due to byproduct formation, B$_{24}$F$_{23}{}^{2-}$.

Example 10 shows that lowering the acidity of neat HF with even a relatively weak base, such as fluoride ion can eliminate yield loss due to dimer formation.

Examples 11–13 show formic acid as a solvent/carrier can result in high yields of substantially complete fluorinated borohydride and it limits the operational problems due to insolubility of the product salt. It is for the reason that the highly fluorinated borohydride is soluble in the reaction medium that one can achieve high levels of fluorinated product, i.e., y in the anion, B$_{12}$F$_y$H$_{12-y}{}^{2-}$, is greater than 10 and preferably at least 11 and one can achieve high yields. In anhydrous HF, as employed in Examples 1–3, the product became more insoluble with increasing fluorination. This problem was observed primarily in HF solutions and occurred any time an attempt was made to fluorinate a concentrated substrate solution in HF.

Not related to the acidity of the reaction medium but a factor in reducing byproduct formation, Examples 12–13 also demonstrate the impact of radical scavengers on fluorination of dodecaborates in organic acids.

Examples 14–15 show that acetic acid is effective in providing a suitable reaction medium for the direct fluorination of the dodecaborate anion salt.

Together examples 11–16 show that anhydrous organic acids or mixtures of these acids with anhydrous HF provide an effective reaction media for direct fluorination of the dodecaborate anion.

Example 17 shows that $H_2SO_4$ is a suitable acid for adjusting the direct fluorination reaction medium to an appropriate level.

Examples 18–19 show that even water is a reasonably effective solvent provided the substrate concentration is sufficiently high to generate >10 wt % acid by the completion of the reaction and provided radical scavengers are used in the fluorinations.

Comparative Example 20 shows the impact of reaction media too low in acidity.

What is claimed is:

1. In a liquid phase process for the direct fluorination of borohydride salts to broadly produce compounds of the formula, $M_a[R_bZ_cB_dH_eF_y]_k$ where M is a cation having a valence of from 1–4, R is a halogen or an alkyl group, Z is C, Si, Ge, Sn, Pb, N, P, As, Sb, or Bi; B is boron, H is hydrogen, a is 1 or 2; b is an integer from 0 to 7; c is an integer from 0 to 1; d is an integer from 5 to 12; e is an integer from 0 to 9; y is an integer from 3 to 12 and is 1, 2 or 3 wherein a multiplied by the valence of M is equal to the integer k or 2 times the integer and further wherein said borohydride salt is contacted with fluorine, under conditions for forming said compound, the improvement in the liquid phase process which comprises:

effecting the fluorination of said borohydride salt in the presence of a reaction medium having an acidity between that of water and neat HF.

2. The process of claim 1 wherein b and c are 0.

3. The process of claim 2 wherein the reaction medium has a Hammett acidity, $H_o$, and $0>H_o>-11$.

4. The process of claim 1 wherein M is a Group I-A, II-A, I-B and II-B having atomic numbers up to and including 80.

5. The process of claim 4 wherein the cation M is an alkali and alkaline earth metal selected from the group consisting of lithium, sodium, potassium, rubidium, cesium, beryllium, magnesium, calcium, strontium, and barium.

6. The process of claim 1 wherein a fluorine concentration from 10 to 40% by volume is employed in the direct fluorination.

7. The process of claim 1 wherein d is an integer selected from the group consisting of 10 and 12.

8. The process of claim 7 wherein the cation M is selected from the group consisting of lithium, potassium, barium, and cesium.

9. The process of claim 1 wherein the cation M is selected from the group consisting of $H_3O^+$, $R'NH_3^+$, $R'_2NH_2^{+1}$, $R'_3NH^+$, $R'_4N^+$, $R'_3S^+$, and $R'_4P^+$, wherein R' is an open chain, closed chain, saturated or unsaturated hydrocarbon or substituted hydrocarbon group.

10. The process of claim 9 wherein the cation M is $R'NH_3$ wherein R' is methyl or ethyl.

11. The process of claim 1 wherein the reaction medium comprises formic acid.

12. The process of claim 1 wherein the reaction medium comprises anhydrous hydrogen fluoride buffered with an alkali metal fluoride or formic acid.

13. In a process for the direct fluorination of borohydride salts to produce the fluorinated borohydride compounds $M_aB_{12}H_{(12-y)}F_y$, the improvement for the production of fluorinated borohydride compounds where y is at at least 10 which comprises:

effecting the fluorination of the borohydride salt in a reaction medium having an acidity between that of water and neat HF.

14. The process of claim 13 wherein M is selected from the group consisting of $H_3O^+$, lithium, potassium, barium, cesium and $R'NH_3$, wherein R' is methyl or ethyl.

15. The process of claim 14 wherein said reaction medium has a Hammett acidity from −2 to −6.

16. The process of claim 13 wherein the reaction medium comprises an acid selected from the group consisting of formic add, acetic acid, sulfuric acid, triflic acid, and trifluoroacetic acid.

17. The process of claim 14 wherein a fluorine concentration of from 10 to 40% by volume is employed in the direct fluorination.

18. The process of claim 15 wherein the reaction medium comprises formic acid or a fluoride selected from the group consisting of potassium or sodium fluoride.

19. The process of claim 15 wherein the reaction medium comprises anhydrous hydrogen fluoride buffered with an alkali metal fluoride or water.

20. The process of claim 1 wherein said borohydride salt is a fluorinated borohydride salt.

21. The process of claim 1, wherein said borohydride salt comprises $B_{10}H_{10}^{-2}$ or $B_{12}H_{12}^{-2}$.

22. The process of claim 11, wherein the reaction medium further comprises a radical scavenger.

* * * * *